(12) United States Patent
Kulavik

(10) Patent No.: US 9,889,383 B2
(45) Date of Patent: Feb. 13, 2018

(54) CONFIGURING HEADSET VOICE MORPH BASED ON PLAYER ASSIGNMENT

(71) Applicant: Voyetra Turtle Beach, Inc., Valhalla, NY (US)

(72) Inventor: Richard Kulavik, San Jose, CA (US)

(73) Assignee: Voyetra Turtle Beach, Inc., Valhalla, NY (US)

( * ) Notice: Subject to any disclaimer, the term of this patent is extended or adjusted under 35 U.S.C. 154(b) by 458 days.

(21) Appl. No.: 14/445,933

(22) Filed: Jul. 29, 2014

(65) Prior Publication Data

US 2015/0099583 A1 Apr. 9, 2015

Related U.S. Application Data

(60) Provisional application No. 61/886,585, filed on Oct. 3, 2013.

(51) Int. Cl.
*A63F 13/87* (2014.01)
*A63F 13/54* (2014.01)
*A63F 13/77* (2014.01)
*A63F 13/215* (2014.01)

(52) U.S. Cl.
CPC .............. *A63F 13/87* (2014.09); *A63F 13/54* (2014.09); *A63F 13/215* (2014.09); *A63F 13/77* (2014.09)

(58) Field of Classification Search
USPC ..................................................... 463/35, 42
See application file for complete search history.

(56) References Cited

U.S. PATENT DOCUMENTS

| 7,785,197 B2* | 8/2010 | Smith | A63F 13/12 463/30 |
| 8,602,892 B1* | 12/2013 | Reiss | A63F 13/32 370/266 |
| 2006/0025214 A1* | 2/2006 | Smith | A63F 13/12 463/30 |
| 2013/0006629 A1* | 1/2013 | Honda | G06F 17/30681 704/236 |

* cited by examiner

*Primary Examiner* — Pierre E Elisca
(74) *Attorney, Agent, or Firm* — McAndrews, Held & Malloy, Ltd.

(57) ABSTRACT

An electronic device may be configurable to operate in a voice morphing mode, such as while processing chat audio and microphone audio for a player participating in an online multiplayer game via a game console. While operating in the voice morphing mode, the electronic device may be configured to modify particular audio (e.g., player chat) based on one or more parameter settings, corresponding to particular audio profile (e.g., corresponding to a particular character). The electronic device may initiate voice morphing based on command from the player, and/or based on a signal received by the electronic device, such as indicating a role of the player (e.g., the game character selected by and/or assigned to the player). Audio profiles and/or parameter settings may be preset, and may be stored for use thereof, such as in electronic device itself or in other location (e.g., the game console or a remote database).

20 Claims, 12 Drawing Sheets

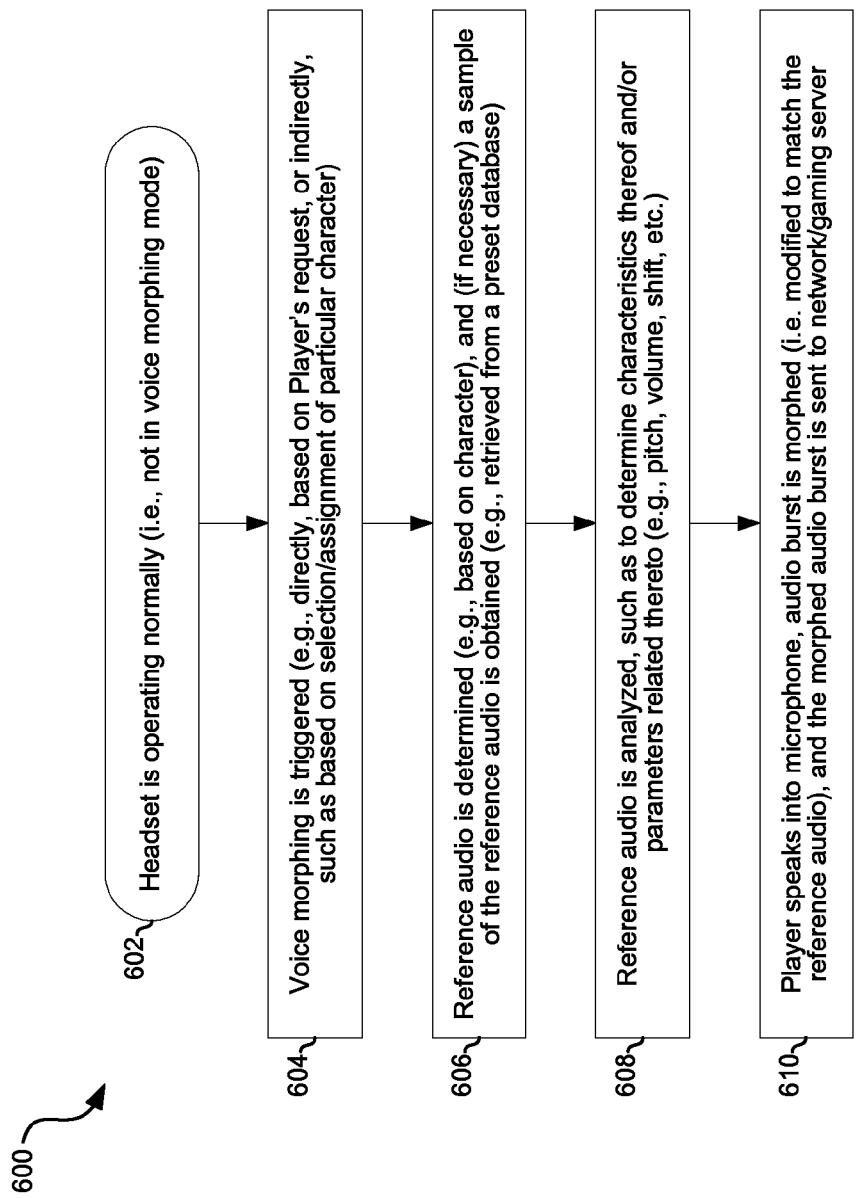

US 9,889,383 B2

CONFIGURING HEADSET VOICE MORPH BASED ON PLAYER ASSIGNMENT

CLAIM OF PRIORITY

This patent application makes reference to, claims priority to and claims benefit from the U.S. Provisional Patent Application No. 61/886,585, filed Oct. 3, 2013 and entitled "Configuring Headset Voice Morph Based on Player Assignment," which is hereby incorporated herein by reference in its entirety.

INCORPORATION BY REFERENCE

The entirety of each of the following applications is hereby incorporated herein by reference: U.S. patent application Ser. No. 13/040,144 entitled "Gaming Headset with Programmable Audio" and published as US2012/0014553. The above stated application(s) is hereby incorporated herein by reference in its entirety.

TECHNICAL FIELD

Aspects of the present application relate to electronic gaming. More specifically, to methods and systems for configuring headset voice morph based on player assignment.

BACKGROUND

Limitations and disadvantages of conventional approaches to audio processing for gaming will become apparent to one of skill in the art, through comparison of such approaches with some aspects of the present method and system set forth in the remainder of this disclosure with reference to the drawings.

BRIEF SUMMARY

Methods and systems are provided for configuring headset voice morph based on player assignment, substantially as illustrated by and/or described in connection with at least one of the figures, as set forth more completely in the claims.

BRIEF DESCRIPTION OF THE DRAWINGS

FIG. 6 is a flowchart illustrating an example process for configuring headset voice morph based on player assignment.

DETAILED DESCRIPTION

Figure 1A:
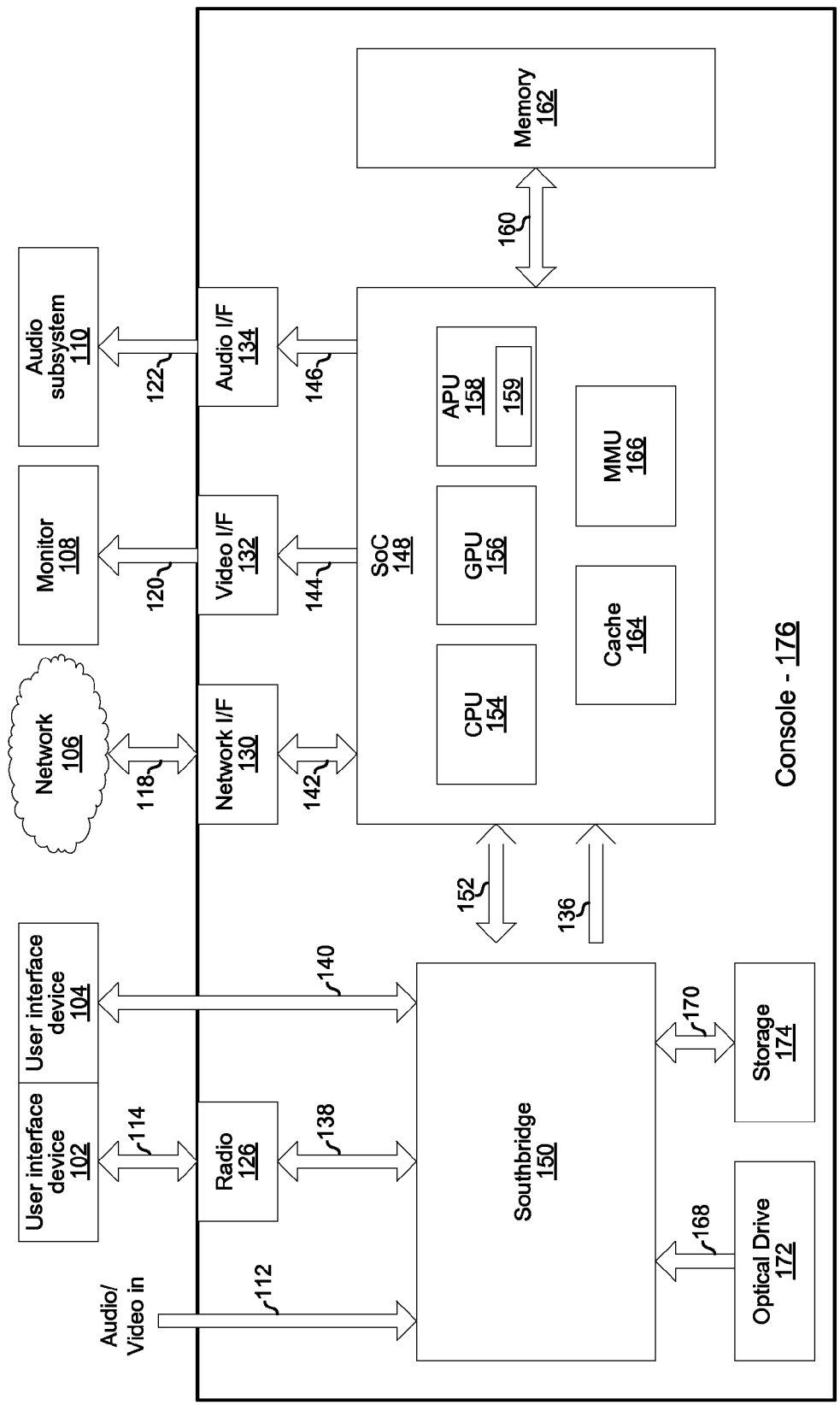
FIG. 1A depicts an example gaming console.

As utilized herein the terms "circuits" and "circuitry" refer to physical electronic components (e.g., hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

Referring to FIG. 1, there is shown game console 176 which may be, for example, a Windows computing device, a Unix computing device, a Linux computing device, an Apple OSX computing device, an Apple iOS computing device, an Android computing device, a Microsoft Xbox, a Sony Playstation, a Nintendo Wii, or the like. The example game console 176 comprises a video interface 124, radio 126, data interface 128, network interface 130, video interface 132, audio interface 134, southbridge 150, main system on chip (SoC) 148, memory 162, optical drive 172, and storage device 174. The SoC 148 comprises central processing unit (CPU) 154, graphics processing unit (GPU) 156, audio processing unit (APU) 158, cache memory 164, and memory management unit (MMU) 166. The various components of the game console 176 are communicatively coupled through various busses/links 136, 128, 142, 14, 146, 152, 160, 169, and 170.

The southbridge 150 comprises circuitry that supports one or more data bus protocols such as High-Definition Multimedia Interface (HDMI), Universal Serial Bus (USB), Serial Advanced Technology Attachment 2 (SATA 2), embedded multimedia card interface (e.MMC), Peripheral Component Interconnect Express (PCIe), or the like. The southbridge 150 may receive audio and/or video from an external source via link 112 (e.g., HDMI), from the optical drive (e.g., Blu-Ray) 172 via link 168 (e.g., SATA 2), and/or from storage 174 (e.g., hard drive, FLASH memory, or the like) via link 170 (e.g., SATA 2 and/or e.MMC). Digital audio and/or video is output to the SoC 148 via link 136 (e.g., CEA-861-E compliant video and IEC 61937 compliant audio). The southbridge 150 exchanges data with radio 126 via link 138 (e.g., USB), with external devices via link 140 (e.g., USB), with the storage 174 via the link 170, and with the SoC 148 via the link 152 (e.g., PCIe).

The radio 126 comprises circuitry operable to communicate in accordance with one or more wireless standards such as the IEEE 802.11 family of standards, the Bluetooth family of standards, and/or the like.

The network interface 130 may comprise circuitry operable to communicate in accordance with one or more wired standards and to convert between wired standards. For example, the network interface 130 may communicate with the SoC 148 via link 142 using a first standard (e.g., PCIe) and may communicate with the network 106 using a second standard (e.g., gigabit Ethernet).

The video interface 132 may comprise circuitry operable to communicate video in accordance with one or more wired or wireless video transmission standards. For example, the video interface 132 may receive CEA-861-E compliant video data via link 144 and encapsulate/format/etc., the video data in accordance with an HDMI standard for output to the monitor 108 via an HDMI link 120.

The audio interface 134 may comprise circuitry operable to communicate audio in accordance with one or more wired or wireless audio transmission standards. For example, the audio interface 134 may receive CEA-861-E compliant video data via link 144 and encapsulate/format/etc. the video data in accordance with an HDMI standard for output to the monitor 108 via an HDMI link 120.

The central processing unit (CPU) 154 may comprise circuitry operable to execute instructions for controlling/coordinating the overall operation of the game console 176. Such instructions may be part of an operating system of the console and/or part of one or more software applications running on the console.

The graphics processing unit (GPU) 156 may comprise circuitry operable to perform graphics processing functions such as compression, decompression, encoding, decoding, 3D rendering, and/or the like.

The audio processing unit (APU) 158 may comprise circuitry operable to perform audio processing functions such as volume/gain control, compression, decompression, encoding, decoding, surround-sound processing, and/or the like to output single channel or multi-channel (e.g., 2 channels for stereo or 5, 7, or more channels for surround sound) audio signals. The APU 158 comprises memory (e.g., volatile and/or nonvolatile memory) 159 which stores parameter settings that affect processing of audio by the APU 158. For example, the parameter settings may include a first audio gain/volume setting that determines, at least in part, a volume of game audio output by the console 176 and a second audio gain/volume setting that determines, at least in part, a volume of chat audio output by the console 176. The parameter settings may be modified via a graphical user interface (GUI) of the console and/or via an application programming interface (API) provided by the console 176.

The cache memory 164 comprises high-speed memory (typically DRAM) for use by the CPU 154, GPU 156, and/or APU 158. The memory 162 may comprise additional memory for use by the CPU 154, GPU 156, and/or APU 158. The memory 162, typically DRAM, may operate at a slower speed than the cache memory 164 but may also be less expensive than cache memory as well as operate at a higher-speed than the memory of the storage device 174. The MMU 166 controls accesses by the CPU 154, GPU 156, and/or APU 158 to the memory 162, the cache 164, and/or the storage device 174.

In FIG. 1A, the example game console 176 is communicatively coupled to a user interface device 102, a user interface device 104, a network 106, a monitor 108, and audio subsystem 110.

Each of the user interface devices 102 and 104 may comprise, for example, a game controller, a keyboard, a motion sensor/position tracker, or the like. The user interface device 102 communicates with the game console 176 wirelessly via link 114 (e.g., Wi-Fi Direct, Bluetooth, and/or the like). The user interface device 102 communicates with the game console 176 via the wired link 140 (e.g., USB or the like).

The network 160 comprises a local area network and/or a wide area network. The game console 176 communicates with the network 106 via wired link 118 (e.g., Gigabit Ethernet).

The monitor 108 may be, for example, a LCD, OLED, or PLASMA screen. The game console 176 sends video to the monitor 108 via link 120 (e.g., HDMI).

The audio subsystem 110 may be, for example, a headset, a combination of headset and audio basestation, or a set of speakers and accompanying audio processing circuitry. The game console 176 sends audio to the subsystem 110 via link(s) 122 (e.g., S/PDIF for digital audio or "line out" for analog audio). Additional details of an example audio subsystem 110 are described below.

Figure 1B:
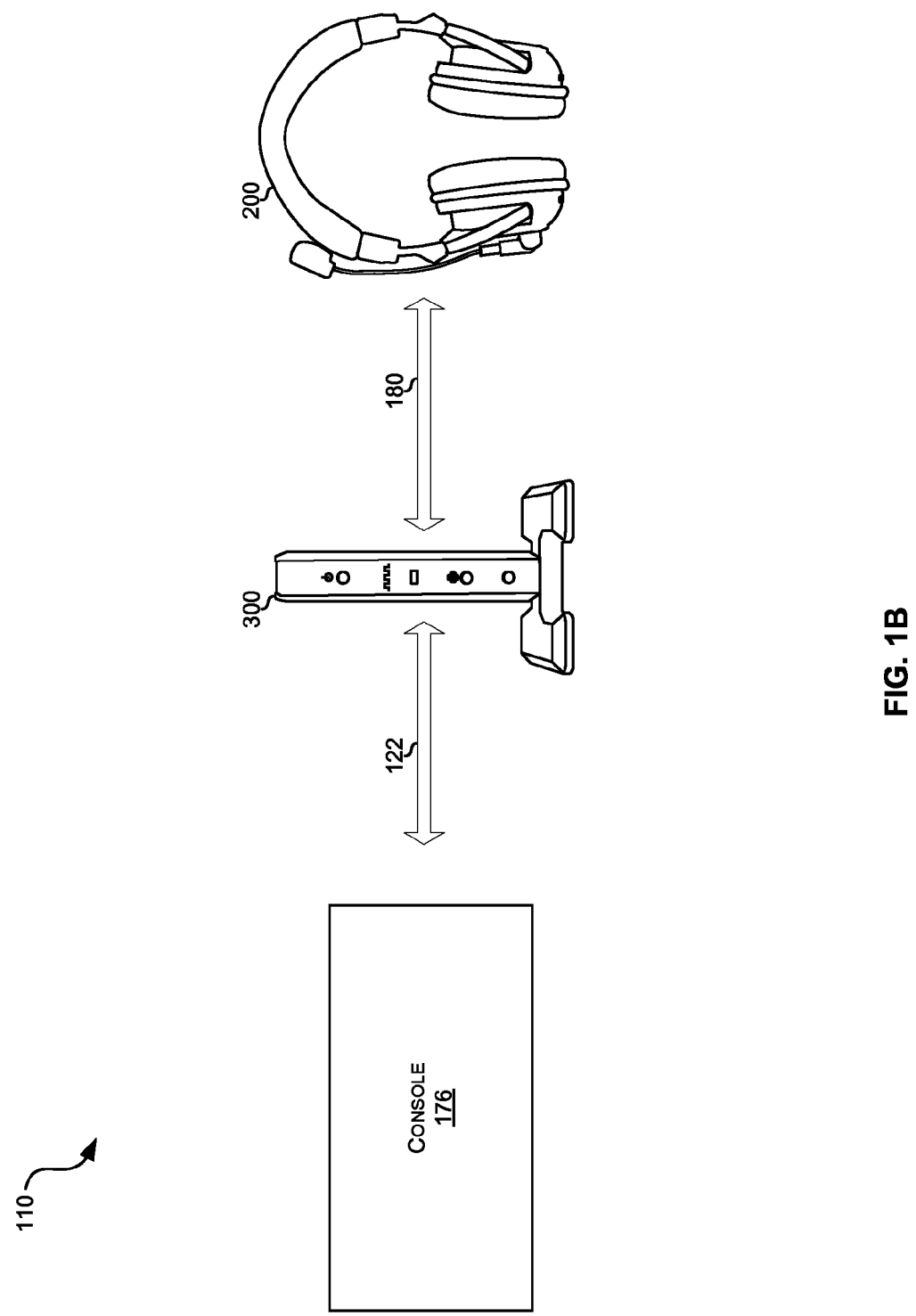
FIG. 1B depicts an example gaming audio subsystem comprising a headset and an audio basestation.
Figure 1C:
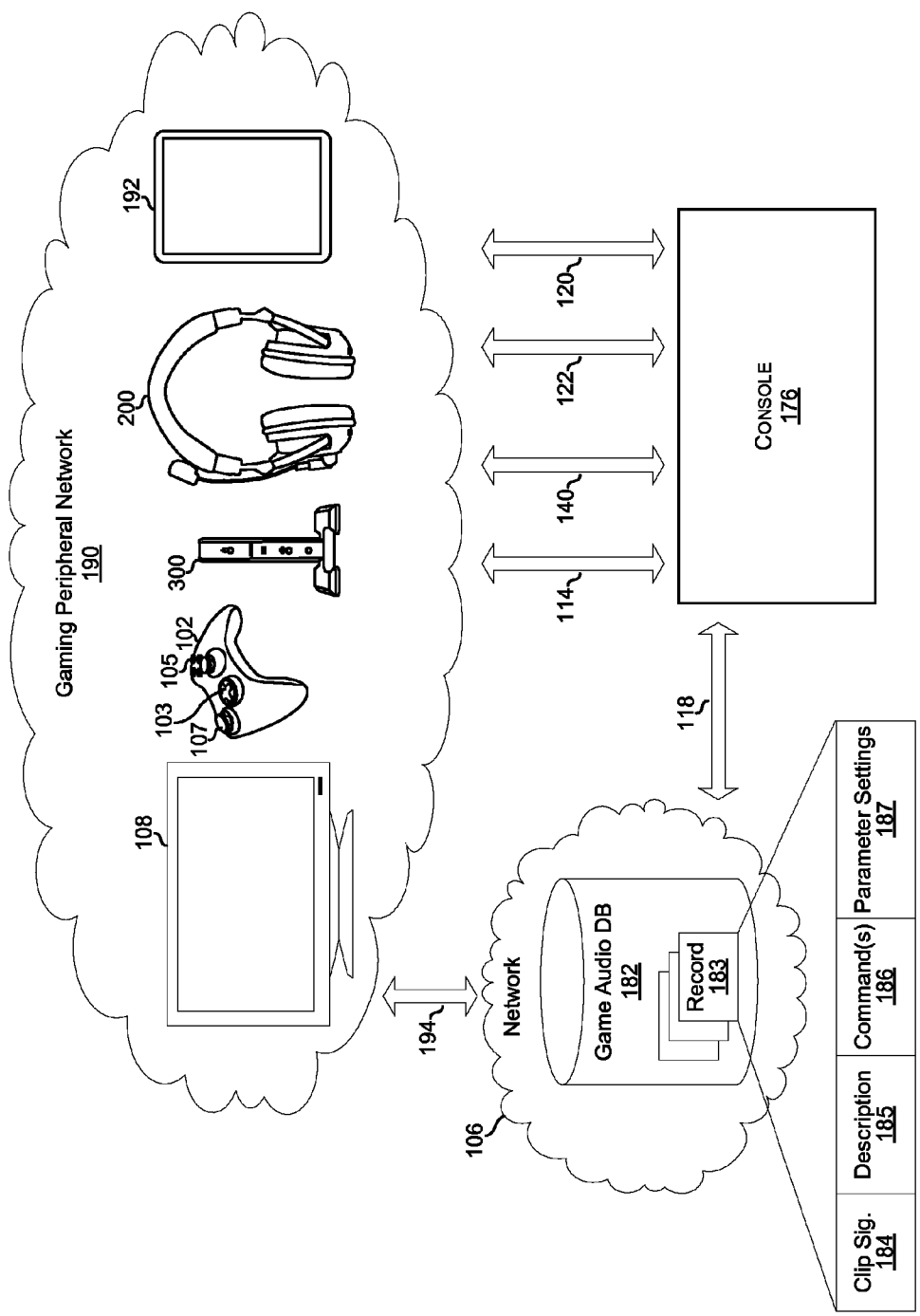
FIG. 1C depicts the example gaming console and an associated network of peripheral devices.

FIG. 1B depicts an example gaming audio subsystem comprising a headset and an audio basestation. Shown is a headset 200 and an audio basestation 300. The headset 200 communicates with the basestation 300 via a link 180 and the basestation 300 communicates with the console 176 via a link 122. The link 122 may be as described above. In an example implementation, the link 180 may be a proprietary wireless link operating in an unlicensed frequency band. The headset 200 may be as described below with reference to FIGS. 2A-2C. The basestation 300 may be as described below with reference to FIGS. 3A-3B.

Referring to FIG. 1C, again shown is the console 176 connected to a plurality of peripheral devices and a network 106. The example peripheral devices shown include a monitor 108, a user interface device 102, a headset 200, an audio basestation 300, and a multi-purpose device 192.

The monitor 108 and user interface device 102 are as described above. An example implementation of the headset 200 is described below with reference to FIGS. 2A-2C. An example implementation of the audio basestation is described below with reference to FIGS. 3A-3B.

The multi-purpose device 192 may be, for example, a tablet computer, a smartphone, a laptop computer, or the like and that runs an operating system such as Android, Linux, Windows, iOS, OSX, or the like. An example implementation of the multi-purpose device 192 is described below with reference to FIG. 4. Hardware (e.g., a network adaptor) and software (i.e., the operating system and one or more applications loaded onto the device 192) may configure the device 192 for operating as part of the GPN 190. For example, an application running on the device 192 may cause display of a graphical user interface via which a user can access gaming-related data, commands, functions, parameter settings, etc. and via which the user can interact with the console 176 and the other devices of the GPN 190 to enhance his/her gaming experience.

The peripheral devices 102, 108, 192, 200, 300 are in communication with one another via a plurality of wired and/or wireless links (represented visually by the placement of the devices in the cloud of GPN 190). Each of the peripheral devices in the gaming peripheral network (GPN) 190 may communicate with one or more others of the peripheral devices in the GPN 190 in a single-hop or multi-hop fashion. For example, the headset 200 may communicate with the basestation 300 in a single hop (e.g., over a proprietary RF link) and with the device 192 in a single hop (e.g., over a Bluetooth or Wi-Fi direct link), while the tablet may communicate with the basestation 300 in two hops via the headset 200. As another example, the user interface device 102 may communicate with the headset 200 in a single hop (e.g., over a Bluetooth or Wi-Fi direct link) and with the device 192 in a single hop (e.g., over a Bluetooth or Wi-Fi direct link), while the device 192 may communicate with the headset 200 in two hops via the user interface device 102. These example interconnections among the peripheral devices of the GPN 190 are merely examples, any number and/or types of links among the devices of the GPN 190 is possible.

The GPN 190 may communicate with the console 176 via any one or more of the connections 114, 140, 122, and 120 described above. The GPN 190 may communicate with a network 106 via one or more links 194 each of which may be, for example, Wi-Fi, wired Ethernet, and/or the like.

A database 182 which stores gaming audio data is accessible via the network 106. The gaming audio data may comprise, for example, signatures of particular audio clips (e.g., individual sounds or collections or sequences of sounds) that are part of the game audio of particular games, of particular levels/scenarios of particular games, particular characters of particular games, etc. In an example implementation, the database 182 may comprise a plurality of records 183, where each record 183 comprises an audio clip (or signature of the clip) 184, a description of the clip 184 (e.g., the game it is from, when it occurs in the game, etc.), one or more gaming commands 186 associated with the clip, one or more parameter settings 187 associated with the clip, and/or other data associated with the audio clip. Records 183 of the database 182 may be downloadable to, or accessed in real-time by, one of more devices of the GPN 190.

Figure 2A:
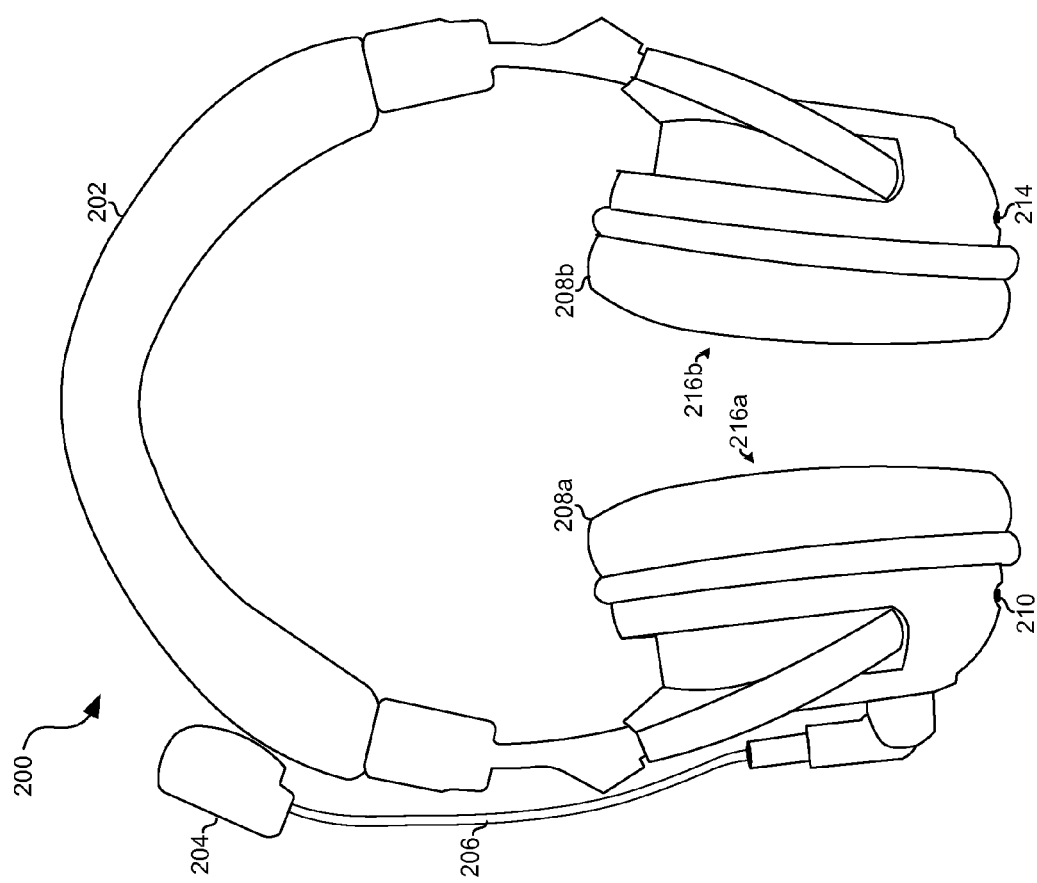
FIGS. 2A and 2B depict two views of an example embodiment of a gaming headset.
Figure 2B:
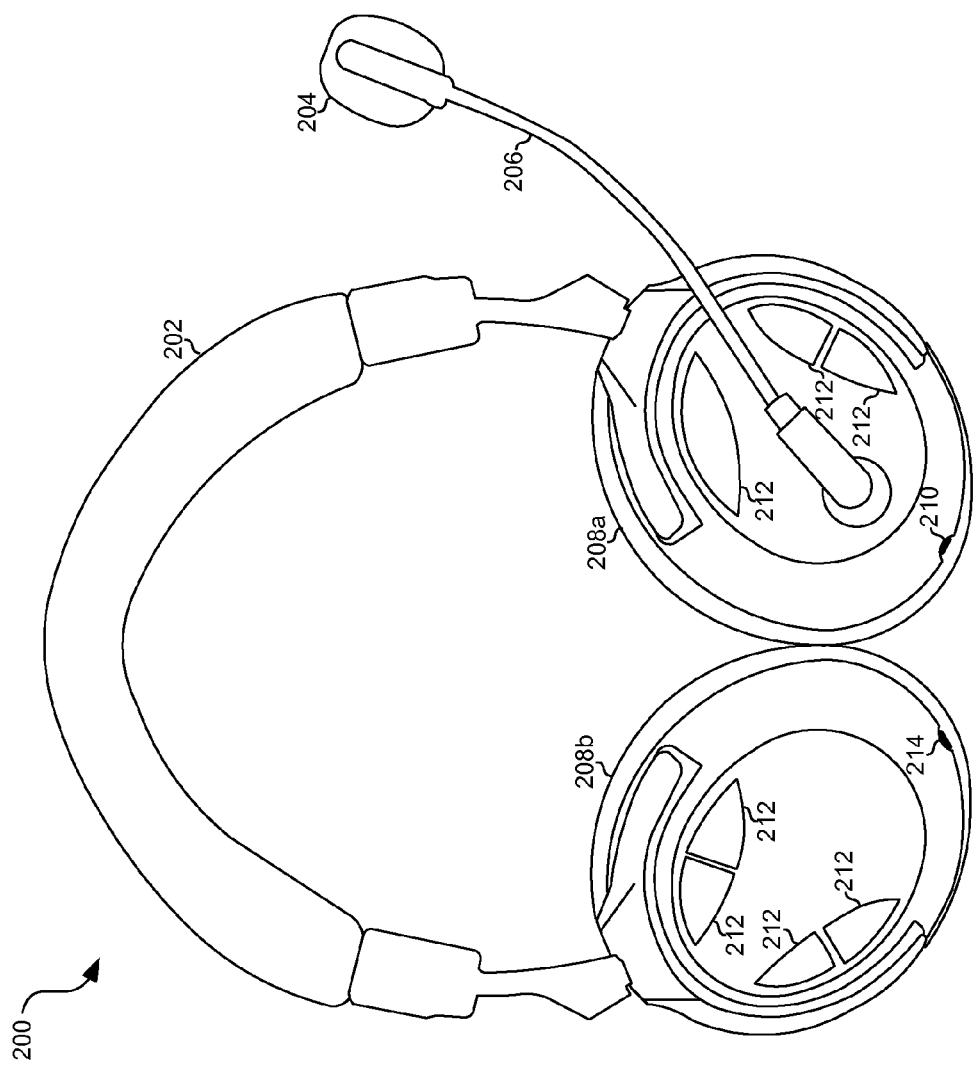

Referring to FIGS. 2A and 2B, there is shown two views of an example headset 200 that may present audio output by a gaming console such as the console 176. The headset 200 comprises a headband 202, a microphone boom 206 with microphone 204, ear cups 208a and 208b which surround speakers 216a and 216b, connector 210, connector 214, and user controls 212.

The connector 210 may be, for example, a 3.5 mm headphone socket for receiving analog audio signals (e.g., receiving chat audio via an Xbox "talkback" cable).

The microphone 204 converts acoustic waves (e.g., the voice of the person wearing the headset) to electric signals for processing by circuitry of the headset and/or for output to a device (e.g., console 176, basestation 300, a smartphone, and/or the like) that is in communication with the headset.

The speakers 216a and 216b convert electrical signals to soundwaves.

The user controls 212 may comprise dedicated and/or programmable buttons, switches, sliders, wheels, etc. for performing various functions. Example functions which the controls 212 may be configured to perform include: power the headset 200 on/off, mute/unmute the microphone 204, control gain/volume of, and/or effects applied to, chat audio by the audio processing circuitry of the headset 200, control gain/volume of, and/or effects applied to, game audio by the audio processing circuitry of the headset 200, enable/disable/initiate pairing (e.g., via Bluetooth, Wi-Fi direct, or the like) with another computing device, and/or the like.

The connector 214 may be, for example, a USB port. The connector 214 may be used for downloading data to the headset 200 from another computing device and/or uploading data from the headset 200 to another computing device. Such data may include, for example, parameter settings (described below). Additionally, or alternatively, the connector 214 may be used for communicating with another computing device such as a smartphone, tablet compute, laptop computer, or the like.

Figure 2C:
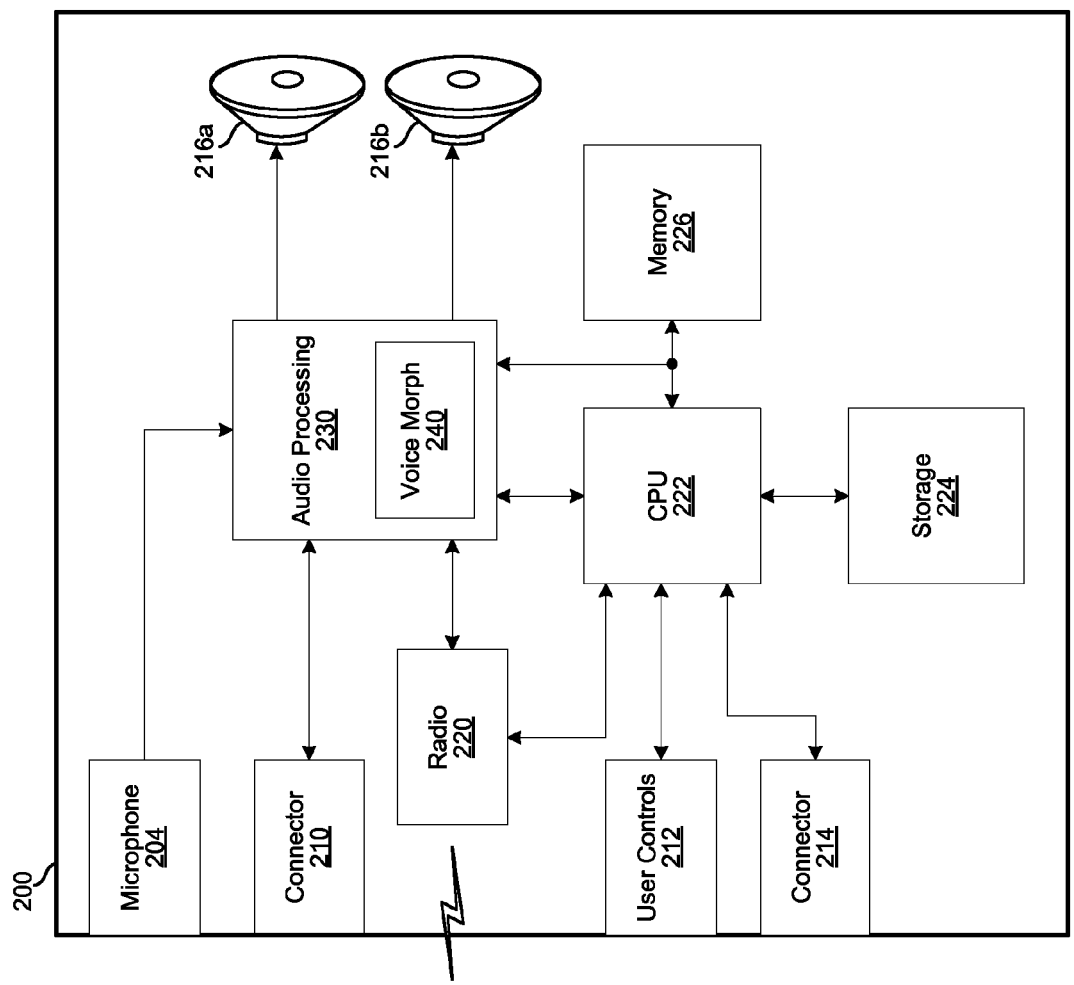
FIG. 2C depicts a block diagram of the example headset of FIGS. 2A and 2B.

FIG. 2C depicts a block diagram of the example headset 200. In addition to the connector 210, user controls 212, connector 214, microphone 204, and speakers 216a and 216b already discussed, shown are a radio 220, a CPU 222, a storage device 224, a memory 226, and an audio processing circuit 230.

The radio 220 may comprise circuitry operable to communicate in accordance with one or more standardized (such as, for example, the IEEE 802.11 family of standards, the Bluetooth family of standards, and/or the like) and/or proprietary wireless protocol(s) (e.g., a proprietary protocol for receiving audio from an audio basestation such as the basestation 300).

The CPU 222 may comprise circuitry operable to execute instructions for controlling/coordinating the overall operation of the headset 200. Such instructions may be part of an operating system or state machine of the headset 200 and/or part of one or more software applications running on the headset 200. In some implementations, the CPU 222 may be, for example, a programmable interrupt controller, a state machine, or the like.

The storage device 224 may comprise, for example, FLASH or other nonvolatile memory for storing data which may be used by the CPU 222 and/or the audio processing circuitry 230. Such data may include, for example, parameter settings that affect processing of audio signals in the headset 200 and parameter settings that affect functions performed by the user controls 212. For example, one or more parameter settings may determine, at least in part, a gain of one or more gain elements of the audio processing circuitry 230. As another example, one or more parameter settings may determine, at least in part, a frequency response of one or more filters that operate on audio signals in the audio processing circuitry 230. As another example, one or more parameter settings may determine, at least in part, whether and which sound effects are added to audio signals in the audio processing circuitry 230 (e.g., which effects to add to microphone audio to morph the user's voice). Example parameter settings which affect audio processing are described in the co-pending U.S. patent application Ser. No. 13/040,144 titled "Gaming Headset with Programmable Audio" and published as US2012/0014553, the entirety of which is hereby incorporated herein by reference. Particular parameter settings may be selected autonomously by the headset 200 in accordance with one or more algorithms, based on user input (e.g., via controls 212), and/or based on input received via one or more of the connectors 210 and 214.

The memory 226 may comprise volatile memory used by the CPU 230 and/or audio processing circuit 230 as program memory, for storing runtime data, etc.

The audio processing circuit 230 may comprise circuitry operable to perform audio processing functions such as volume/gain control, compression, decompression, encoding, decoding, introduction of audio effects (e.g., echo, phasing, virtual surround effect, etc.), and/or the like. As described above, the processing performed by the audio processing circuit 230 may be determined, at least in part, by which parameter settings have been selected. The processing may be performed on game, chat, and/or microphone audio that is subsequently output to speaker 216a and 216b. Additionally, or alternatively, the processing may be performed on chat audio that is subsequently output to the connector 210 and/or radio 220.

In an example implementation, the audio processing circuit 230 may incorporate a voice morph controller 240, which may be configurable to perform and/or manage voice morphing during audio processing. With voice morphing, a particular audio (e.g., microphone audio and/or player chat audio) may be modified to match a particular audio profile. The voice morphing may be triggered manually/directly (e.g., based on user specific input/command), and/or automatically/indirectly based on other related actions/conditions (e.g., based on selection/assignment of character in gaming scenarios without the user having to provide separate input for the configuration of the voice morphing).

For example, in gaming scenarios, the microphone audio may be morphed to match an audio profile corresponding to particular character in the game. Accordingly, in an example use scenario, the headset 200 may initially determine which character in the game was selected by, or had been assigned to, the player wearing the headset 200. In this regard, the headset 200 may determine the character based on information received via a link (e.g., Bluetooth, Wi-Fi Direct, or the like) to the console and/or to the application running on the multipurpose device 192—e.g., a received signal may cause the application to indicate when the player has selected or been assigned a character and/or which character the player has been assigned. The preset audio profile may then be sent to the headset 200—e.g., the console or application may send the corresponding preset audio profile to the headset. Furthermore, in some instances, metadata associated with each character (e.g., in the game/console itself and/or in the app) may contain information about voice morph presets for the characters.

The voice morph controller 240 may then be configured to provide, during audio processing in the circuit 230, voice morphing such that particular audio feeds (e.g., bursts of player microphone audio) may match an audio profile associated with the character. For example, in instances where the headphone 200 is operating in voice morphing mode, the audio processing may be configured such that if a player selects a first character in the game which may typically be associated with loudness (e.g., person of authority), the player's voice would be morphed to match a corresponding representative audio profile (e.g., a loud angry voice); whereas if the player selects another character in the game which may typically characterized with stealth or quietness, the player's voice would be morphed to match a different corresponding representative audio profile (e.g., a whisper voice). In some instances, some characters may lack corresponding preset audio profiles. Accordingly, the headset (e.g., via the voice morph controller 240) may determine 'default' audio profiles which may be utilized for such characters lacking corresponding preset profiles.

In some instances, audio profiles for game characters may be stored (and be retrievable) from centralized repositories. For example, a network based presets database (e.g., as part of the game audio DB 182) may be configured, which may be used to store voices and related information for particular games (or characters therein). Accordingly, during voice morphing operations, voice morph presets for a particular game may be downloaded from the database upon starting up that game and selection/assignment of character. The retrieval and/or download of preset audio profiles (and/or of audio samples or parameter settings corresponding thereto) may be done automatically—i.e., without requiring the users to take any additional steps. Rather, the retrieval and/or download may be triggered by other, normal activities— e.g., selection by or assignment to a player of particular character in a particular game.

Figure 3A:
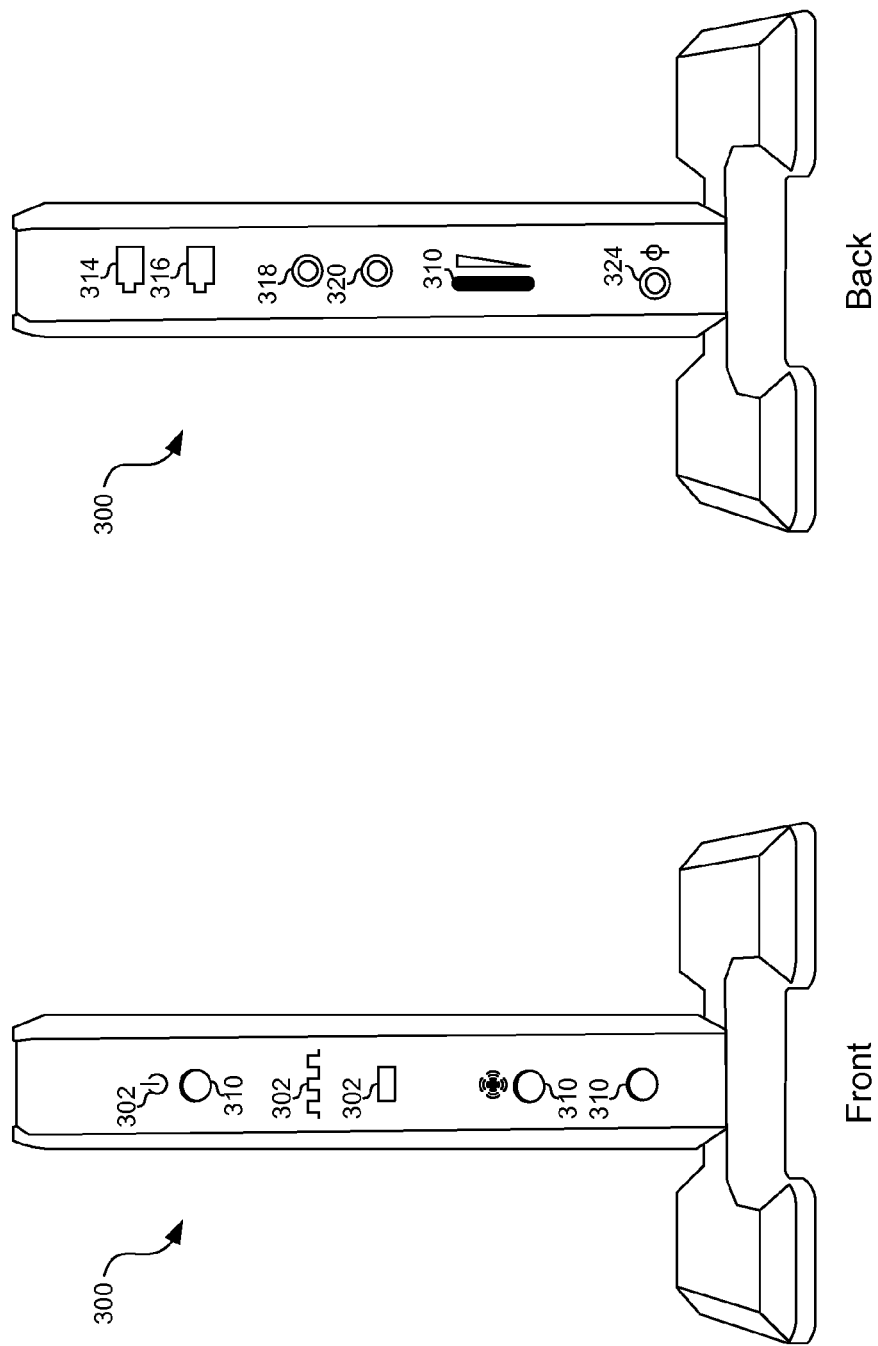
FIG. 3A depicts two views of an example embodiment of an audio basestation.

FIG. 3A depicts two views of an example embodiment of the audio basestation 300. The basestation 300 comprises status indicators 302, user controls 310, power port 324, and audio connectors 314, 316, 318, and 320.

The audio connectors 314 and 316 may comprise digital audio in and digital audio out (e.g., S/PDIF) connectors, respectively. The audio connectors 318 and 320 may comprise a left "line in" and a right "line in" connector, respectively. The controls 310 may comprise, for example, a power button, a button for enabling/disabling virtual surround sound, a button for adjusting the perceived angles of the speakers when the virtual surround sound is enabled, and a dial for controlling a volume/gain of the audio received via the "line in" connectors 318 and 320. The status indicators 302 may indicate, for example, whether the audio basestation 300 is powered on, whether audio data is being received by the basestation 300 via connectors 314, and/or what type of audio data (e.g., Dolby Digital) is being received by the basestation 300.

Figure 3B:
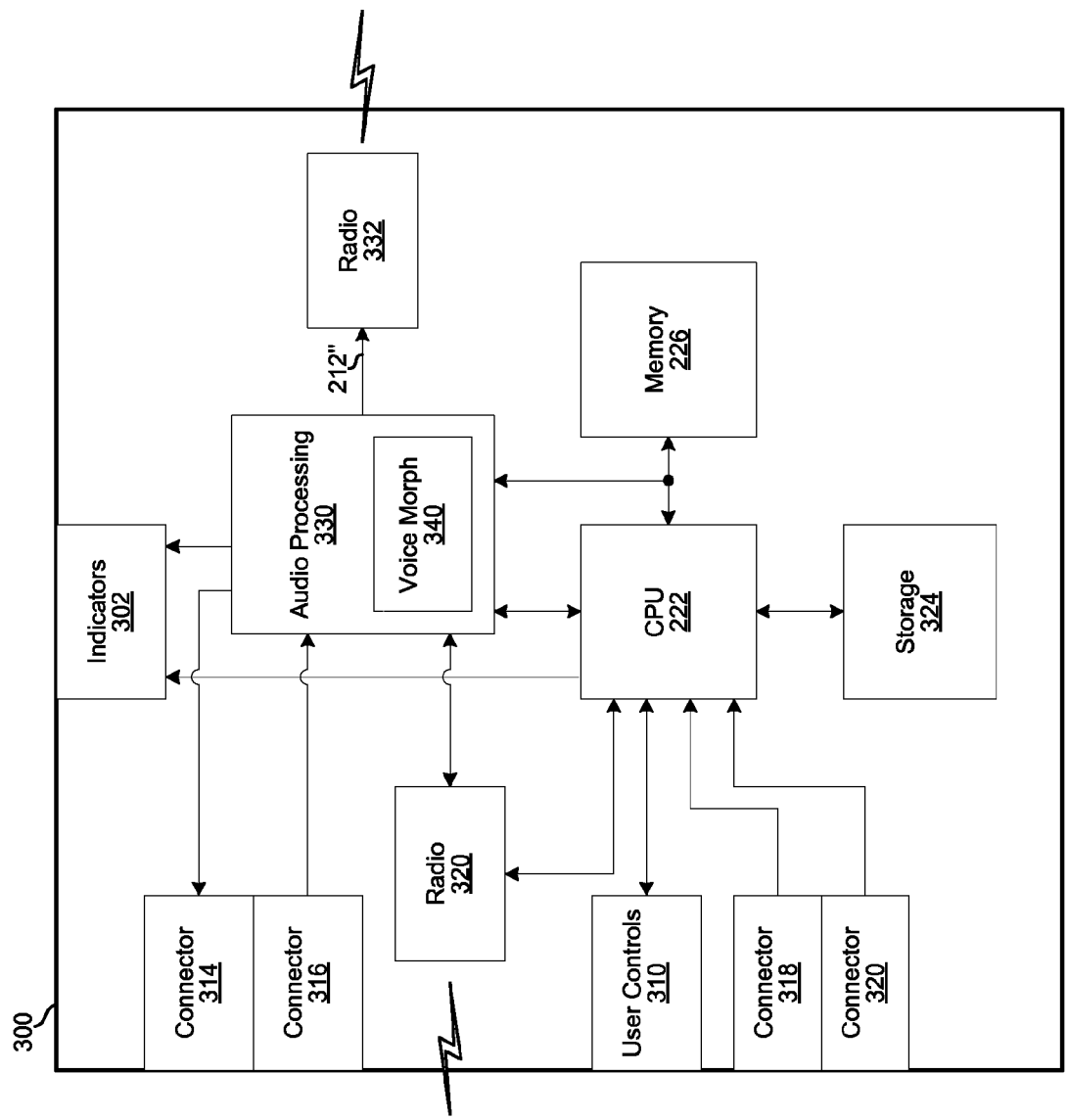
FIG. 3B depicts a block diagram of the audio basestation 400.

FIG. 3B depicts a block diagram of the audio basestation 300. In addition to the user controls 310, indicators 302, and connectors 314, 316, 318, and 320 described above, the block diagram additionally shows a CPU 322, a storage device 324, a memory 326, a radio 320, an audio processing circuit 330, and a radio 332.

The radio 320 comprises circuitry operable to communicate in accordance with one or more standardized (such as the IEEE 802.11 family of standards, the Bluetooth family of standards, and/or the like) and/or proprietary (e.g., proprietary protocol for receiving audio protocols for receiving audio from a console such as the console 176) wireless protocols.

The radio 332 comprises circuitry operable to communicate in accordance with one or more standardized (such as, for example, the IEEE 802.11 family of standards, the Bluetooth family of standards, and/or the like) and/or proprietary wireless protocol(s) (e.g., a proprietary protocol for transmitting audio to headphones 200).

The CPU 322 comprises circuitry operable to execute instructions for controlling/coordinating the overall operation of the audio basestation 300. Such instructions may be part of an operating system or state machine of the audio basestation 300 and/or part of one or more software applications running on the audio basestation 300. In some implementations, the CPU 322 may be, for example, a programmable interrupt controller, a state machine, or the like.

The storage 324 may comprise, for example, FLASH or other nonvolatile memory for storing data which may be used by the CPU 322 and/or the audio processing circuitry 330. Such data may include, for example, parameter settings that affect processing of audio signals in the basestation 300. For example, one or more parameter settings may determine, at least in part, a gain of one or gain elements of the audio processing circuitry 330. As another example, one or more parameter settings may determine, at least in part, a frequency response of one or more filters that operate on audio signals in the audio processing circuitry 330. As another example, one or more parameter settings may determine, at least in part, whether and which sound effects are added to audio signals in the audio processing circuitry 330 (e.g., which effects to add to microphone audio to morph the user's voice). Example parameter settings which affect audio processing are described in the co-pending U.S. patent application Ser. No. 13/040,144 titled "Gaming Headset with Programmable Audio" and published as US2012/0014553, the entirety of which is hereby incorporated herein by reference. Particular parameter settings may be selected autonomously by the basestation 300 in accordance with one or more algorithms, based on user input (e.g., via controls 310), and/or based on input received via one or more of the connectors 314, 316, 318, and 320.

The memory 326 may comprise volatile memory used by the CPU 322 and/or audio processing circuit 330 as program memory, for storing runtime data, etc.

The audio processing circuit 330 may comprise circuitry operable to perform audio processing functions such as volume/gain control, compression, decompression, encoding, decoding, introduction of audio effects (e.g., echo, phasing, virtual surround effect, etc.), and/or the like. As described above, the processing performed by the audio processing circuit 330 may be determined, at least in part, by which parameter settings have been selected. The processing may be performed on game and/or chat audio signals that are subsequently output to a device (e.g., headset 200) in communication with the basestation 300. Additionally, or alternatively, the processing may be performed on a microphone audio signal that is subsequently output to a device (e.g., console 176) in communication with the basestation 300.

In an example implementation, the audio processing circuit 330 may comprise a voice morph controller 340, which may be configurable to perform and/or manage voice morphing. In this regard, the voice morphing performed in the basestation 300 (provided by the voice morph controller 340) may be substantially similar to the voice morphing in the voice morphing in the headset 200 (provided, mainly, by the voice morph controller 240), as described with respect to FIG. 1C for example.

Figure 4:
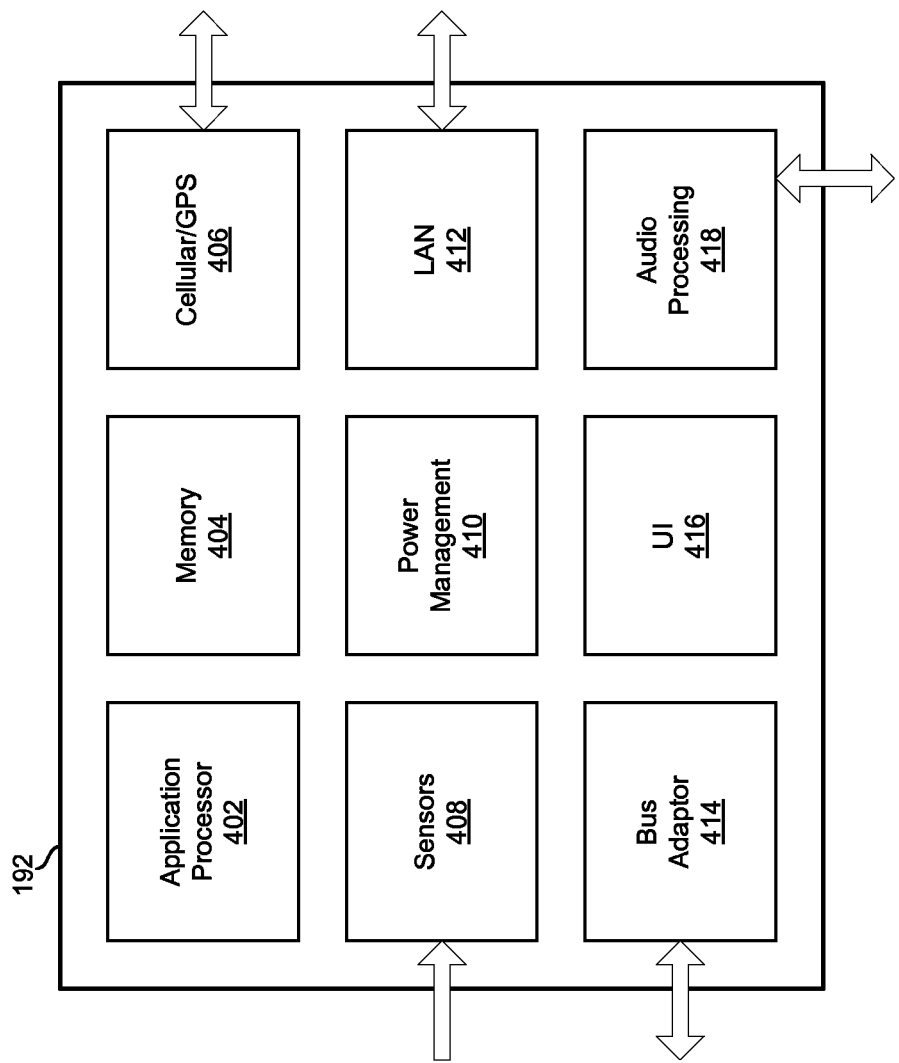
FIG. 4 depicts a block diagram of an example multipurpose device.

FIG. 4 depicts a block diagram of an example multi-purpose device 192. The example multi-purpose device 192 comprises a an application processor 402, memory subsystem 404, a cellular/GPS networking subsystem 406, sensors 408, power management subsystem 410, LAN subsystem 412, bus adaptor 414, user interface subsystem 416, and audio processor 418.

The application processor 402 comprises circuitry operable to execute instructions for controlling/coordinating the overall operation of the multi-purpose device 192 as well as graphics processing functions of the multi-purpose device 402. Such instructions may be part of an operating system of the console and/or part of one or more software applications running on the console.

The memory subsystem 404 comprises volatile memory for storing runtime data, nonvolatile memory for mass storage and long-term storage, and/or a memory controller which controls reads writes to memory.

The cellular/GPS networking subsystem 406 comprises circuitry operable to perform baseband processing and analog/RF processing for transmission and reception of cellular and GPS signals.

The sensors 408 comprise, for example, a camera, a gyroscope, an accelerometer, a biometric sensor, and/or the like.

The power management subsystem 410 comprises circuitry operable to manage distribution of power among the various components of the multi-purpose device 192.

The LAN subsystem 412 comprises circuitry operable to perform baseband processing and analog/RF processing for transmission and reception of cellular and GPS signals.

The bus adaptor 414 comprises circuitry for interfacing one or more internal data busses of the multi-purpose device with an external bus (e.g., a Universal Serial Bus) for transferring data to/from the multi-purpose device via a wired connection.

The user interface subsystem 416 comprises circuitry operable to control and relay signals to/from a touchscreen, hard buttons, and/or other input devices of the multi-purpose device 192.

The audio processor 418 comprises circuitry to process (e.g., digital to analog conversion, analog-to-digital conversion, compression, decompression, encryption, decryption, resampling, etc.) audio signals. The audio processor 418 may be operable to receive and/or output signals via a connector such as a 3.5 mm stereo and microphone connector.

Figure 5A:
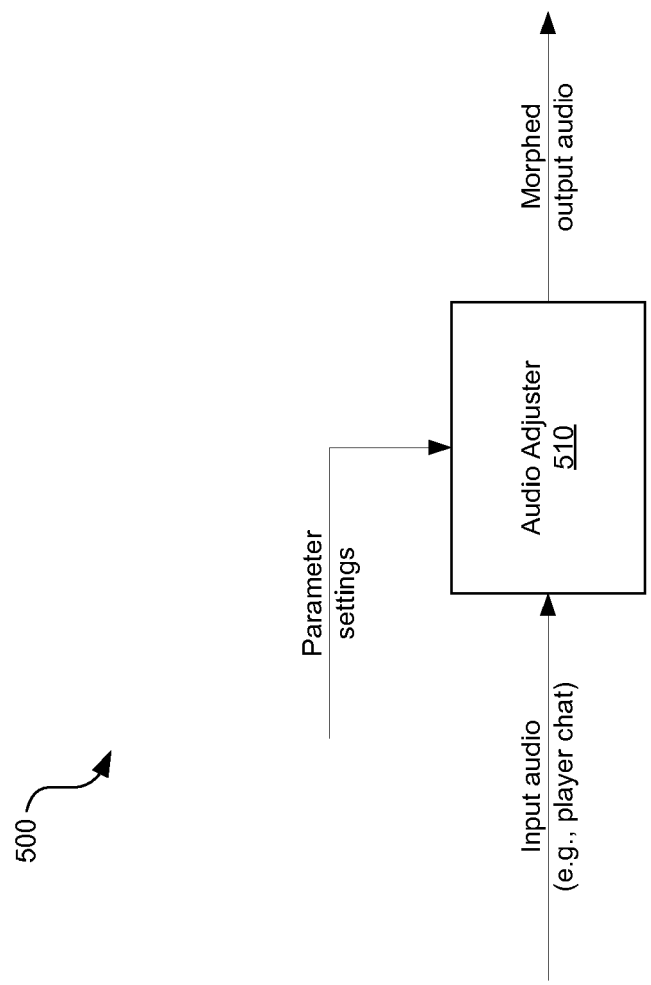
FIG. 5A depicts a block diagram illustrating an example voice morph circuit.

FIG. 5A depicts a block diagram illustrating an example voice morph circuit with built-in analyzer. Referring to FIG. 5A, there is shown a voice morph circuit 500.

The voice morph circuit 500 may comprise circuitry for use in performing voice morphing. In this regard, the voice morph circuit 500 may be incorporated into a suitable audio system, such as in a headset (e.g., the headset 200) or a basestation (e.g., the basestation 300), to enable providing voice morphing functions therein. Accordingly, the voice morph circuit 500 may correspond to (at least portion of) the voice morphing components 240 and 340. In gaming scenarios, the voice morph circuit 500 may be utilized to morph players voices (e.g., bursts of microphone audio during gameplay), such as to match characters used by the players. Typically voice morphing of each of the players may be performed on the microphone audio of the player's respective device (e.g., respective headset 200). Where separate players' voices in the chat audio can be distinguished (e.g., because the different player's microphone audio arrive via different links, in packets with unique identifiers, etc.), however, voice morphing (or un-morphing—i.e., returning a morphed voice back to the player's natural voice) may be performed on received chat audio. In such an instance, in an example implementation, morphing (or un-morphing) of multiple players' voices may be performed in a single device (e.g., basestation 300) as opposed to each player's voice being morphed in a respective device (e.g., each player's headset 200 morphing only its own microphone audio).

In the example implementation shown in FIG. 5A, the voice morph circuit 500 may comprise an audio adjuster sub-circuit 510, which may be configured to adjust an input audio (e.g., corresponding to voice of user of a system incorporating the voice morph circuit 500). In this regard, the input audio may be adjusted by the audio adjuster sub-circuit 510 based on audio adjustment related parameter settings, which may be inputted into the audio adjuster sub-circuit 510. Accordingly, the audio adjuster sub-circuit 510 may adjust the input audio (e.g., user voice), by morphing it, using the parameter settings, to match a preset audio profile (e.g., corresponding to a game character). The parameter settings may correspond to and/or facilitate setting of audio components such as volume, pitch, or tone. The parameter settings may be obtained or retrieved by the voice morph circuit 500, such as from local source (e.g., the game console or storage 224 of the headset, where they would have been previously stored) or from a remote resource (e.g., a database, such as the database 182). Alternatively, the parameter settings may be inputted or set directly by the player. In this regard, the player may use prior knowledge of desired audio parameters (e.g., the audio parameters associated with particular game characters), or in instances where the player may lack prior knowledge, the player (e.g., the player does not have any audio of the voice the player wants), the player may just adjust available audio parameters (e.g., using suitable interface or control means such as, for example, the interface described with reference to FIG. 8 of above-incorporated U.S. patent application Ser. No. 13/040,144) until obtaining the desired (morphed) voice. In such scenarios, the selected parameters may be associated with a particular character of a particular game (and possibly stored, such as in the game console and/or by uploading them to a remote database). Then those parameters can be manually or auto loaded upon starting that game and selecting that character.

In operation, the voice morph circuit 500 may be utilized to perform voice morphing (or audio morphing in general). In this regard, in voice morphing, an audio (e.g., corresponding to player's microphone audio) may be altered or modified to match a particular audio (voice) profile. For example, in gaming scenarios, the audio profile to be matched may correspond to or be associated with a particular game character. In an example use scenario, the voice morph circuit 500 may receive parameter settings (e.g., directly from player, from game console, or from remote database) for use in morphing the input audio, to match particular (preset) audio profile. In this regard, the parameter settings may enable controlling and/or adjusting, for example, audio pitch, audio intensity, and audio tone of the morphed audio. The parameter settings may comprise, e.g., signal frequency settings, signal phase settings, signal gain settings, filter bandwidth and/or filter shape settings, and/or the like. Accordingly, when an input audio (e.g., microphone audio) is received by the voice morph circuit 500, the input audio is fed into the audio adjuster sub-circuit 510, which may then process the input audio, based on the parameter settings, to modify the input audio such that it may match the characteristics (pitch, tone, etc.) of the preset audio profile. Accordingly, the output audio (of the voice morph circuit 500) may comprise a morphed copy of the input audio such that it would match characteristics of the preset audio profile.

Figure 5B:
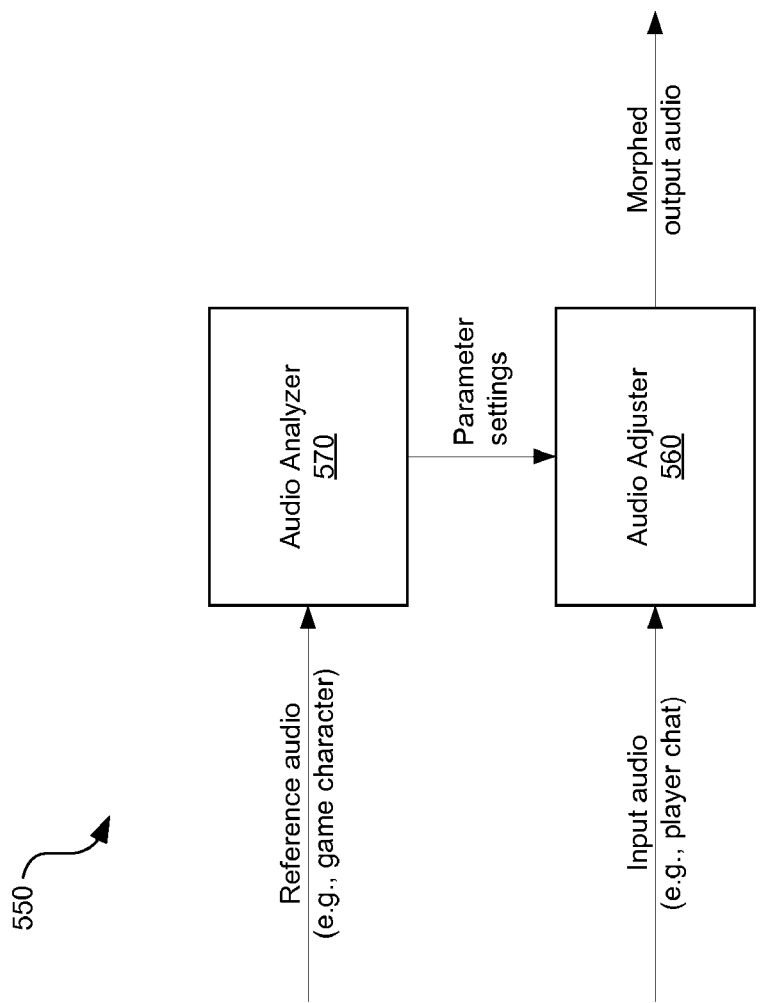
FIG. 5B depicts a block diagram illustrating an example voice morph circuit with built-in audio analyzer.

FIG. 5B depicts a block diagram illustrating an example voice morph circuit with built-in analyzer. Referring to FIG. 5B, there is shown a voice morph circuit 550.

The voice morph circuit 550, like the circuit 500 of FIG. 5A, may comprise circuitry for use in performing voice morphing, and may be incorporated into a suitable audio system, such as in a headset (e.g., the headset 200) or a basestation (e.g., the basestation 300), to enable providing voice morphing functions therein. Accordingly, the voice morph circuit 550 may also correspond to (at least portion of) the voice morphing components 240 and 340, and be utilized in performing voice morphing (or morphing of audio content in general), including in gaming scenarios, as described with respect to FIG. 5A for example.

In the example implementation shown in FIG. 5B, the voice morph circuit 550 may comprise an audio adjuster sub-circuit 560 and an audio analyzer sub-circuit 570. The audio analyzer sub-circuit 570 may be configured to analyze a particular reference audio, and generate information (e.g., parameter settings) pertaining to the reference audio (e.g., pitch, volume, tone, or the like) and/or pertaining to audio signals (phase, frequency, shift, or the like). For example, the reference audio analyzed via the audio analyzer sub-circuit 570 may correspond to a voice of, or to be used for, a particular game character. In this regard, the reference audio (corresponding to the game character) may be retrieved from a database (e.g., the database 182).

The audio adjuster sub-circuit 560 may be substantially similar to the audio adjuster sub-circuit 510 of FIG. 5A. In this regard, the audio adjuster sub-circuit 560 may be configured to adjust an input audio (e.g., corresponding to voice of user of a system incorporating the voice morph circuit 550), such as based on parameter settings. In the voice morph circuit 550, however, the parameter setting utilized in the audio adjusting operations may be generated by the audio analyzer sub-circuit 570, such as based on analysis of the reference audio. Accordingly, the audio adjuster sub-circuit 560 may adjust the input audio (e.g., user voice), by morphing it to match the reference audio (e.g., the game character), such that an output audio would have similar characteristics as the reference audio.

In operation, the voice morph circuit 550 may be utilized to perform voice morphing (or audio morphing in general). In voice morphing, audio (e.g., corresponding to player's microphone audio) may be altered or modified to match a particular audio (voice) profile. For example, in gaming scenarios, the audio profile to be matched may correspond to, or be associated with, a particular game character. In an example use scenario, a reference audio input may be fed into the audio analyzer sub-circuit 570. The reference audio input may, for example, comprise one or more recorded audio clips of a voice that is desired to be associated with a particular game character. The audio analyzer sub-circuit 570 may analyze the reference audio to extract/generate corresponding parameter settings for input to the audio adjuster 560. The parameter settings may enable controlling and/or adjusting, for example, audio pitch, audio intensity, and audio tone of the morphed audio. The parameter settings may comprise, e.g., signal frequency settings, signal phase settings, signal gain settings, filter bandwidth and/or filter shape settings, and/or the like. When an input audio (e.g., microphone audio) is received by the voice morph circuit 550, the input audio is fed into the audio adjuster sub-circuit 560. In addition, the parameter settings, resulting from analysis of the reference audio via the audio analyzer sub-circuit 570, are fed into the audio adjuster sub-circuit 560. The audio adjuster sub-circuit 560 may then process the input audio based on the parameter settings to modify the input audio such that it may match the characteristics (pitch etc.) of the reference audio. Accordingly, the output audio (of the voice morph circuit 550) may comprise a morphed copy of the input audio such that it would match characteristics of the reference audio (corresponding to preset audio profile).

FIG. 6 is a flowchart illustrating an example process for configuring headset voice morph based on player assignment. Referring to FIG. 6, there is shown a flow chart 600, comprising a plurality of example steps.

In starting step 602, a headset (e.g., the headset 200) may be operating normally—i.e., in non-voice morph mode, that is microphone audio output by the headset may sound substantially similar to the voice of the player speaking into the headset (i.e., other players would easily recognize the voice as being the player's voice). In step 604, voice morphing may be triggered, and the headset may transition to voice morph mode. The triggering of the voice morphing may be direct (e.g., based on Player's express request), or indirect, such as, in gaming scenarios for example, based on selection or assignment of particular game character to a player utilizing/wearing the headset.

In step 606, a reference audio may be determined (e.g., a present audio profile associated with the selected/assigned game character). Furthermore, the reference audio (or a sample thereof) may be, if necessary, obtained. In this regard, the reference audio may be retrieved from a local source (e.g., game console), or from remote source, such as from a preset database which may be accessible by the headset, directly or via the game console, via network link(s). In step 608, the reference audio (sample) may be analyzed, such as to determine characteristics thereof and/or parameter settings related thereto (e.g., pitch, volume, shift, etc.). In this regard, the determined characteristics and/or parameter settings may be utilized during voice morphing, such as by adjusting characteristics and/or parameter settings of particular audio (voice) based thereon, to match the audio (voice) to the reference audio. In some instances, steps 608 and 610 may be bypassed. For example, rather than obtaining and analyzing reference audio, parameter settings used in controlling and/or enabling the audio morphing may be input directly or retrieved from a source (local or remote). In other words, rather than generating the parameter settings by analyzing reference audio, these parameter settings may be used directly.

In step 610, when the player speaks into microphone, the corresponding audio burst is processed, with the processing comprising morphing the burst (i.e. modifying to match the reference audio), and the morphed audio burst is then transmitted (e.g., to network/gaming server).

The present method and/or system may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A headset, comprising a microphone, wherein:
    the headset is configurable to operate in a voice morphing mode while processing chat audio and microphone audio for a first player participating in an online multiplayer game via a game console; and
    while operating in the voice morphing mode, the headset is configured to:
        receive a signal indicating a role of the first player in the online multiplayer game;
        determine one or more parameter settings for voice morphing based on the role of the first player;
        modify at least the microphone audio for the first player based on the determined one or more parameter settings; and
        transmit the microphone audio for the first player to the game console.

2. The headset of claim 1, wherein the one or more parameter settings relate to: audio pitch, audio intensity, and/or audio tone.

3. The headset of claim 1, wherein the role of the player corresponds to a character in the online multiplayer game.

4. The headset of claim 1, wherein the signal is received over one of: a communication link between the headset and the game console, and a communication link between the headset and a gaming peripheral device.

5. The headset of claim 1, wherein the one or more parameter settings are available in a database that is associated with online gaming.

6. The headset of claim 5, wherein the one or more parameter settings are retrieved, by the headset, from the database during the voice morphing mode.

7. The headset of claim 1, wherein the headset is operable to process reference audio to determine the one or more parameter settings.

8. The headset of claim 7, wherein the reference audio is a recording of a voice having audio characteristics desirable for the role.

9. The headset of claim 7, wherein the reference audio is available in a database that is associated with online gaming.

10. The headset of claim 8, wherein the reference audio is retrieved, by the headset and/or via the game console, from the database during the voice morphing mode.

11. A method, comprising:
    in a headset that comprises a microphone and is configurable to operate in a voice morphing mode while processing chat audio and microphone audio for a first player participating in an online multiplayer game via a game console, and while operating in the voice morphing mode:
        receiving a signal indicating a role of the first player in the online multiplayer game;
        determining determine one or more parameter settings for voice morphing based on the role of the first player;
        modifying at least the microphone audio for the first player based on the determined one or more parameter settings; and
        transmitting the microphone audio for the first player to the game console.

12. The method of claim 11, wherein the one or more parameter settings relate to: audio pitch, audio intensity, and/or audio tone.

13. The method of claim 11, wherein the role of the player corresponds to a character in the online multiplayer game.

14. The method of claim 11, comprising receiving the signal over one of: a communication link between the headset and the game console, and a communication link between the headset and a gaming peripheral device.

15. The method of claim 11, wherein the one or more parameter settings are available in a database that is associated with online gaming.

16. The method of claim 15, comprising retrieving, by the headset and/or via the game console, the one or more parameter settings from the database during the voice morphing mode.

17. The method of claim 11, comprising determining the one or more parameter settings based on processing of reference audio.

18. The method of claim 17, wherein the reference audio is a recording of a voice having audio characteristics desirable for the role.

19. The method of claim 17, wherein the reference audio is available in a database that is associated with online gaming.

20. The method of claim 19, comprising retrieving the reference audio from the database during the voice morphing mode.

\* \* \* \* \*